M. HERGER.
HORSESHOE.
APPLICATION FILED OCT. 1, 1921.

1,428,167.

Patented Sept. 5, 1922.
2 SHEETS—SHEET 1.

Inventor
Michael Herger
By
Attorney

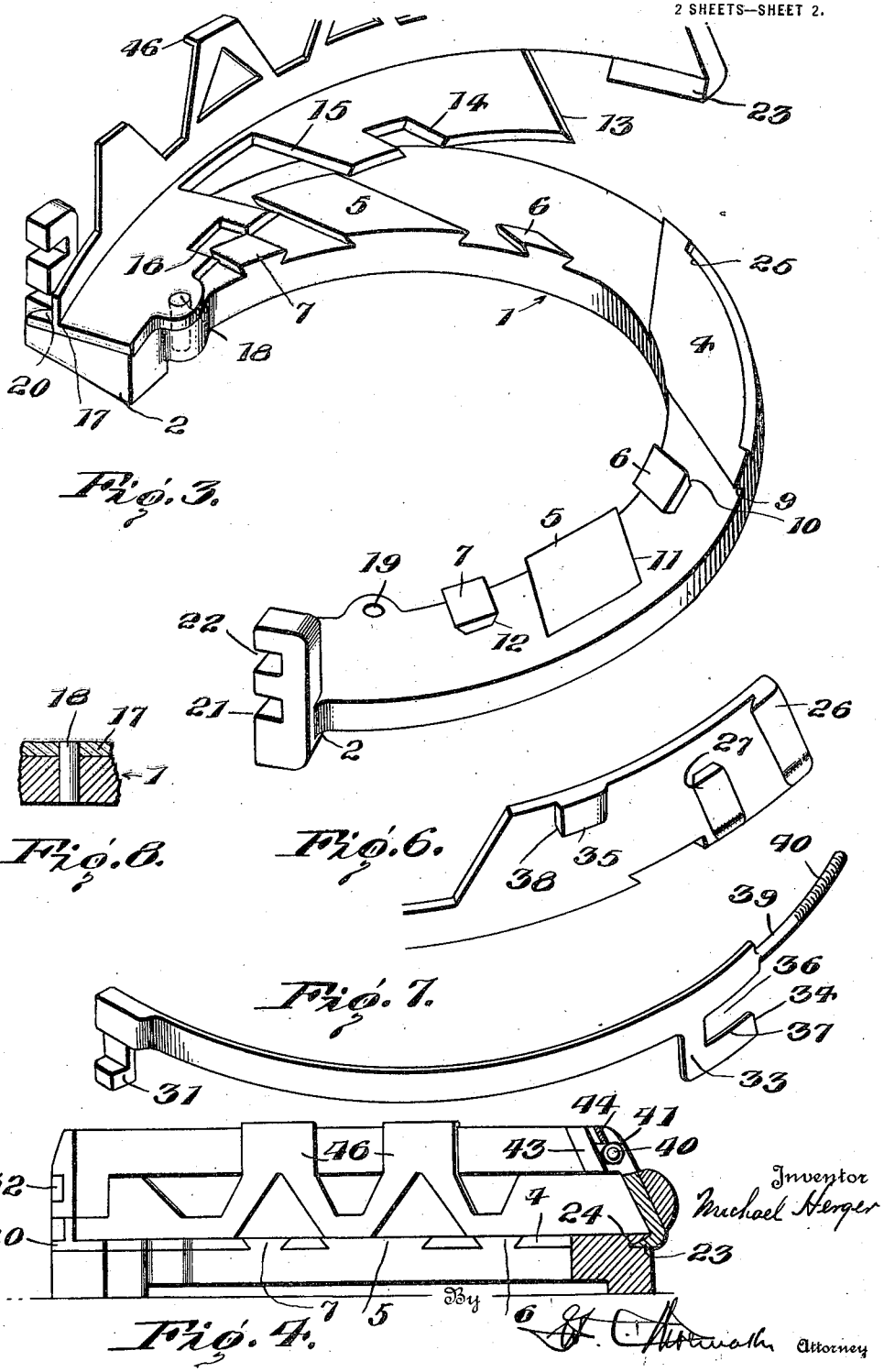

Patented Sept. 5, 1922.

1,428,167

UNITED STATES PATENT OFFICE.

MICHAEL HERGER, OF TONOPAH, NEVADA.

HORSESHOE.

Application filed October 1, 1921. Serial No. 504,701.

*To all whom it may concern:*

Be it known that I, MICHAEL HERGER, a citizen of Switzerland, residing at Tonopah, in the county of Nye, State of Nevada, have invented new and useful Improvements in Horseshoes, of which the following is a specification.

The invention relates to a nailless horseshoe.

The object of the present invention is to improve the construction of horseshoes and to provide a simple, practical and efficient nailless horseshoe of strong durability and comparatively inexpensive construction adapted to be easily and quickly applied to the hoofs of horses or other animals and capable of being also readily removed therefrom without the use of horseshoers' tools, ordinarily employed in applying a horseshoe to and removing the same from the hoof of a horse.

Another object of the invention is to provide a horseshoe of this character adapted to be applied to the hoof of a horse by an inexperienced person and to be readily moved at seasons of the year when it is not desired to use a metal shoe on a horse or other animal, thereby enabling horses to be used without shoes in slippery weather and also obviate the necessity of having horses roughshod to prevent them from slipping.

With these and other objects in view the invention consists in the novel construction, combination and arrangement of parts hereinafter fully described, illustrated in the accompanying drawings, and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Fig. 3 is a perspective view of the shoe proper and one of the hoof clamping sections, the other parts being removed;

Fig. 4 is a longitudinal sectional view of the horseshoe on the line 4—4 of Fig.1;

Fig. 6 is a detail perspective view of a portion of one of the hoof-clamping sections;

Fig. 7 is a perspective view of one of the locking bars; and

Fig. 8 is a detail sectional view illustrating the arrangement of the pivot stud of the clamping section.

Figure 1:
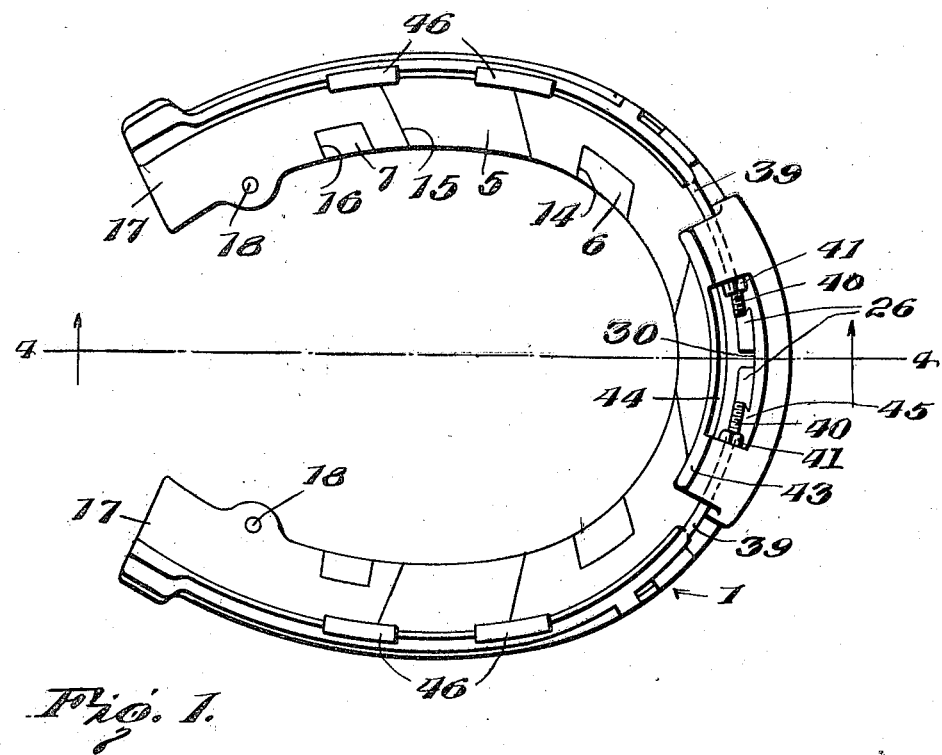
Figure 1 is a plan view of a horseshoe constructed in accordance with this invention.
Figure 2:
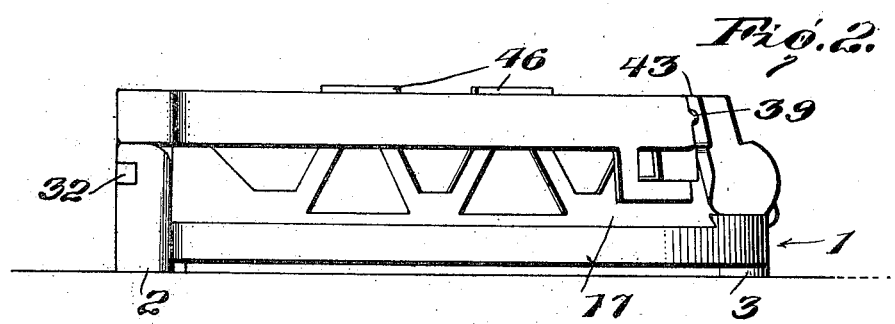
Fig. 2 is a side elevation of the same.
Figure 5:
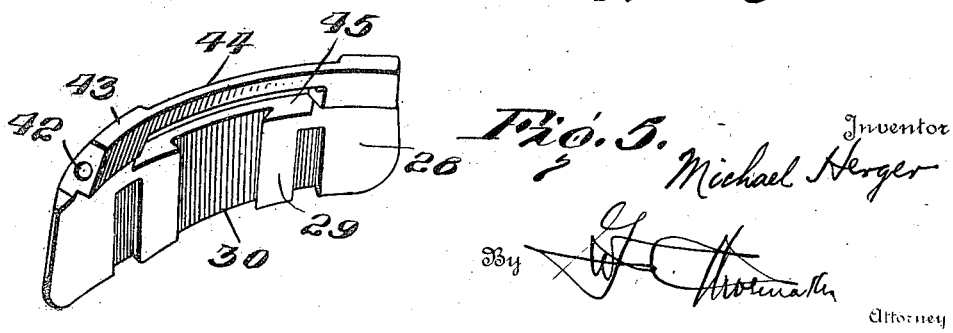
Fig. 5 is a detail perspective view of the front coupling member.

In the accompanying drawings, in which is illustrated the preferred embodiment of the invention, 1 designates the horseshoe proper, provided at its lower face with integral toe and heel calks 2 and 3, but the lower surface or configuration of the horseshoe proper may be constructed in any other desired manner as will be readily understood, and in practice one or more horseshoes 1 may be provided for the device to be clamped to a hoof by the means hereinafter described. The horseshoe 1 is provided at its upper face with a front integral anchoring or attaching lug 4 and side anchoring or attaching lugs 5, 6 and 7 arranged in spaced relation with each other and with the front or toe anchoring lug and having their transverse edges 9, 10, 11 and 12 beveled or undercut to interlock with correspondingly beveled transverse edges 13, 14, 15 and 16 of hoof clamping members 17. The hoof clamping members 17, which consist of horizontal bottom walls and upwardly extending inwardly inclined side walls are adapted to embrace and clamp the side portions of the hoof of an animal, and the said side walls have sufficient inward inclination to conform to the configuration of the side and front portions of a hoof, whereby when the side clamping sections are closed upon the hoof the shoe will be securely fastened to the same in proper position against the underside of the hoof. The horizontal bottom wall or portion of the clamping section 17 is arranged flat upon the upper face of the horseshoe and the transverse edges 13, 14, 15 and 16 are formed by recessing the said bottom wall or portion and the recesses or spaces between the said edges of the clamping section receive the side lugs of the horseshoe. The edges of the clamping section, which are correspondingly beveled to fit the undercut beveled edges of the horseshoe are adapted to readily slide into position when the clamping section is swung transversely of the horseshoe. The clamping section is provided adjacent its rear end with a downwardly projecting stud 18 which fits in a bearing opening 19 formed in the horseshoe at each side thereof, preferably in a bulging or projecting portion as shown. In assembling the clamping section on the horseshoe the pivot lug is first introduced into the bearing opening 19, while the clamping section is arranged at an angle to the outer edge of the adjacent side of the horseshoe and the inward swinging movement of the clamping section will carry the interlocked parts of the section and the shoe into engagement with each other. This movement also carries a rear laterally projecting lug 20 into a lower recess 21 of an upwardly projecting post 22 formed integral with the horseshoe at the rear end of each side thereof and located at the outer side edge, as clearly shown in Fig. 3 of the drawings. This rear lug and the depending pivot stud securely interlock the rear end of the clamping section with the rear end of the horseshoe.

The front end of the clamping section 17 is provided at its lower edge with an inwardly extending rib or flange 23 which fits in a pocket 24 in the front portion of the front lug 4, which is recessed or cut away at the front of the shoe at 25 as shown to receive the lower portions of the front ends of the hoof clamping sections.

The hoof clamping sections are provided at their front ends with exteriorly arranged spaced ribs 26 and 27 to engage with interlocking ribs or enlargements 28 and 29 of a front coupling member 30, which is provided at its inner face at its end portion with the said ribs or enlargements 28 and 29. The coacting side edges of the interlocking ribs or enlargements 26, 27, 28 and 29 are beveled or undercut and are arranged at a slight inclination so that when the central coupling member is forced downwardly into position it will interlock with the front ends of the clamping sections and draw the same tightly into engagement with the hoof of the animal. The clamping sections and the coupling member constitute a wall which extends around the front and sides of a hoof to embrace and engage the same and they conform to the configuration of the said hoof. The coupling member holds the clamping sections against outward swinging movement and it is securely locked against upward movement by a pair of curved locking bars, provided at their rear ends with depending substantially L-shaped arms 31 which fit in upper recesses 32 in posts 22 and interlocking the rear ends of the locking bars with the same. The rear L-shaped arms 31 have outwardly projecting lower portions or lugs and the locking bars are provided at their front portions with depending substantially L-shaped arms 33 which have their lower portions 34 spaced from the front ends of the locking bars and adapted to engage beneath lugs or enlargements 35 of the front portions of the clamping sections. The lugs 35 are received in the spaces 36 formed by the L-shaped arms 33 and the upper edge 37 of the forwardly projecting portion 34 of the arm 33 is beveled to engage with the undercut or beveled lower edge 38 of the lug or enlargement 35. By this construction the front portions of the locking bars are securely interlocked with the hoof-clamping sections. The front ends of the locking bars are also provided with longitudinally disposed rounded portions or stems 39, which are threaded at their outer portions 40 to receive nuts 41 for securing the stems 39 in openings 42 in upwardly projecting side portions 43 of the coupling member. The projecting side portions 43 are connected at the top by a curved bar or portion 44 spaced from the lower body portion of the coupling member as shown, and the nuts 41 are located at the space 45 and are out of the way and are not liable to come in contact with an object should the shoes strike the same while in use on a hoof. The side walls of the clamping section are preferably constructed of open work as shown and they are provided at their upper edges with outwardly projecting overhanging flanges 46 which project over the upper edges of the locking bars when the parts are assembled and prevent the locking bars from riding up out of position and contacting with the hoof. The parts may be readily assembled and firmly engaged with a hoof by a light tap with a hammer and when assembled are securely clamped on the hoof, so that the shoe will be firmly held in position without liability of slipping or sliding on the hoof, even when subjected to the several shocks or strains incident to the use of the nailless horseshoe.

What is claimed is:—

1. A device of the class described, including a horseshoe, side hoof-clamping sections pivotally connected at one end to the horseshoe and slidably interlocked with the same, a coupling member connecting the other ends of the clamping sections, and fastening means securing the coupling member to the said sections for retaining the latter in position with relation to the horseshoe.

2. A device of the class described, including a horseshoe, hoof-clamping sections arranged at opposite sides of the horseshoe and pivoted at their rear ends to the same and slidably interlocked with the horseshoe in advance of the pivoted connections, a coupling member slidably interlocked with and connecting the front ends of the hoof-clamping sections, and locking bars interlocked with the horseshoe and the said sections and detachably secured to the coupling member.

3. A device of the class described, including a horseshoe provided at its upper face with front and side lugs or enlargements spaced apart and having undercut transverse edges, hoof-clamping sections located at opposite sides of the horseshoe and provided with bottom portions recessed to form flanges, said flanges having beveled transverse edges fitting between and interlocked with the said lugs or enlargements of the horseshoe, and means for securing the clamping sections in their interlocked relation with the horseshoe.

4. A device of the class described, including a horseshoe provided with front and side lugs or enlargements having undercut edges, hoof-clamping members located at opposite sides of the horseshoe and provided with flanges having coacting edges interlocked with the undercut edges of the said lugs or enlargements of the horseshoe, a coupling member interlocked with and connecting the front ends of the hoof-clamping sections, and locking means securing the coupling member with its interlocked relations with the hoof-clamping sections.

5. A device of the class described, including a horseshoe provided with front and side lugs or enlargements, the front lug being provided at its front edge with a pocket, hoof-clamping sections located at opposite sides of the horseshoe and pivoted at their rear ends to the same and provided at their front ends with projecting portions fitting in the pocket of the front lug or enlargement, said hoof-clamping sections being also provided with projecting portions or flanges interlocking with the lugs or enlargements of the horseshoe, and means for connecting the front ends of the hoof-clamping sections for securing the same in position.

6. A device of the class described, including a horseshoe provided with front and side lugs or enlargements, the front lug being provided at its front edge with a pocket, hoof-clamping sections located at opposite sides of the horseshoe and pivoted at their rear ends to the same and provided at their front ends with projecting portions fitting in the pocket of the front lug or enlargement, said hoof-clamping sections being also provided with projecting portions or flanges interlocking with the lugs or enlargements of the horseshoe, a coupling member connecting the front ends of the sections, said coupling member and sections having coacting slidably interlocking ribs or enlargements, and means for securing the coupling member in its interlocked relation with the hoof-clamping sections.

7. A device of the class described, including a horseshoe provided with front and side lugs or enlargements, the front lug being provided at its front edge with a pocket, hoof-clamping sections located at opposite sides of the horseshoe and pivoted at their rear ends to the same and provided at their front ends with projecting portions fitting in the pocket of the front lug or enlargement, said hoof-clamping sections being also provided with projecting portions or flanges interlocking with the lugs or enlargements of the horseshoe, a coupling member connecting the front ends of the sections, said coupling member and sections having coacting slidably interlocking ribs or enlargements, and side locking bars detachably interlocked at their rear ends with the horseshoe and at their front ends with the hoof-clamping sections, and provided with means for securing their front ends to the coupling member whereby the latter is retained in position.

8. A device of the class described, including a horseshoe provided with front and side lugs or enlargements, the front lug being provided at its front edge with a pocket, hoof-clamping sections located at opposite sides of the horseshoe and pivoted at their rear ends to the same and provided at their front ends with projecting portions fitting in the pocket of the front lug or enlargement, said hoof-clamping sections being also provided with projecting portions or flanges interlocking with the lugs or enlargements of the horseshoe, a coupling member connecting the front ends of the sections, said coupling member and sections having coacting slidably interlocking ribs or enlargements, and side locking bars detachably interlocked at their rear ends with the horseshoe and at their front ends with the hoof clamping sections, and provided at their front ends with stems piercing the end portions of the coupling member and provided with fastening means.

9. A device of the class described, including a horseshoe provided at the rear ends of its sides with upwardly projecting posts having recesses, said horseshoe being also provided adjacent the posts with bearing openings, hoof-clamping sections having pivot studs to fit in the said openings and provided with outwardly projecting lugs to engage with the recesses of the said posts, and having means for slidably interlocking the sections with the horseshoe, a coupling member connecting front ends of the sections, and means for securing the coupling member in position.

10. A device of the class described, including a horseshoe provided at the rear ends of its sides with upwardly projecting posts having recesses, said horseshoe being also provided adjacent the posts with bearing openings, hoof-clamping sections having pivot studs to fit in the said openings and provided with outwardly projecting lugs to engage with the recesses of the said posts, and having means for slidably interlocking the sections with the horseshoe, a coupling member slidably connected with the front ends of the said sections and connecting the same, and side locking bars detachably interlocked at their rear ends with the said posts and at their front ends with the said sections, and provided at their front ends with means for securing them to the coupling member.

11. A device of the class described, including a horseshoe provided at the rear ends of its sides with posts having upper and lower recesses, hoof-clamping sections interlocked with the horseshoe and provided at their rear ends with lugs to engage the lower recesses of the said posts and provided at their front portions with lugs, a coupling member detachably interlocked with and connecting the front ends of the said sections, side locking bars provided at their front and rear portions with arms engaging respectively the upper recesses of the said posts and the front lugs of the said sections, and means for securing the front ends of the locking bars to the coupling member.

12. A device of the class described, including a horseshoe provided at the rear ends of its sides with posts having upper and lower recesses, hoof-clamping sections interlocked with the horseshoe and provided at their rear ends with lugs to engage the lower recesses of the said posts and provided at their front portions with lugs, a coupling member detachably interlocked with and connecting the front ends of the said sections, side locking bars provided at their front and rear portions with arms engaging respectively the upper recesses of the said posts and the front lugs of the said sections, means for securing the front ends of the locking bars to the coupling member, and overhanging flanges projecting from the sections and engaging the upper edges of the locking bars.

13. A device of the class described, including a horseshoe, side hoof-clamping sections composed of bottom portions and inwardly-inclined upwardly-extending side walls, the bottom portions being detachably interlocked with the horseshoe, and the side walls being formed of open work, a front coupling member including the front ends of the said sections, and locking bars interlocked at their rear ends with the horseshoe and at their front ends with the said sections and secured also at their front ends to the coupling member.

14. A device of the class described, including a horseshoe, hoof-clamping sections pivotally connected at their rear ends to the horseshoe and slidably interlocked with the same, a front coupling member slidably interlocked with the said sections and having upwardly projecting end portions provided with openings, said upwardly projecting portions being spaced apart, side locking bars detachably interlocked at their rear ends with the horseshoe and at their front ends with the said sections and provided also at their front ends with threaded stems extending through the openings in the upwardly projecting portions of the coupling member, and nuts engaging the threaded stems of the locking bars and located in the space between the upwardly projecting portions of the coupling member.

In testimony whereof I have hereunto set my hand.

MICHAEL HERGER.